US008484415B2

(12) United States Patent  (10) Patent No.: US 8,484,415 B2
Cho  (45) Date of Patent: Jul. 9, 2013

(54) HYBRID STORAGE SYSTEM FOR A MULTI-LEVEL RAID ARCHITECTURE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 360 days.

(21) Appl. No.: 12/838,553

(22) Filed: Jul. 19, 2010

(65) Prior Publication Data

US 2012/0017036 A1   Jan. 19, 2012

(51) Int. Cl.
*G06F 12/02* (2006.01)
*G06F 3/06* (2006.01)
*G11C 16/02* (2006.01)

(52) U.S. Cl.
USPC .................. 711/114; 711/103; 711/E12.008

(58) Field of Classification Search
None
See application file for complete search history.

(56) References Cited

U.S. PATENT DOCUMENTS

| | | | |
|---|---|---|---|
| 2005/0288961 A1* | 12/2005 | Tabrizi | 705/1 |
| 2007/0150854 A1* | 6/2007 | Mukund et al. | 717/104 |
| 2008/0140932 A1* | 6/2008 | Flynn et al. | 711/114 |
| 2009/0094620 A1* | 4/2009 | Kalwitz et al. | 719/325 |
| 2011/0302358 A1* | 12/2011 | Yu et al. | 711/103 |
| 2012/0084506 A1* | 4/2012 | Colgrove et al. | 711/114 |

OTHER PUBLICATIONS

Hutsell, Woody. "An In-depth Look at the RamSan-620 Flash Solid State Disk." Texas Memory Systems (TMS) White Paper, Jul. 2009. Available at http://www.ramsan.com/files/f000272.pdf among other sources.*
Gruener, Wolfgang. "DDR SSD claims a massive 300,000 IOPS." TG Daily, May 4, 2009. Accessed Aug. 27, 2012 at http://www.tgdaily.com/hardware-features/42283-ddr-ssd-claims-a-massive-300000-iops.*

* cited by examiner

*Primary Examiner* — Reginald Bragdon
*Assistant Examiner* — Daniel Bernard
(74) *Attorney, Agent, or Firm* — Saliwanchik, Lloyd & Eisenschenk

(57) ABSTRACT

The present invention relates to semiconductor storage systems (SSDs). Specifically, the present invention relates to a switch-based hybrid storage system. In a typical embodiment, a set of double data rate semiconductor storage device (DDR SSD) RAID controllers is coupled to a system control board, and a set of DDR SSD modules to the set of DDR SSD RAID controllers. The set of DDR SSD modules typically comprises a set of DDR SSD units. In addition, a set of HDD/Flash SSD RAID controllers is also coupled to the system control board, and a set of hard disk drive (HDD) modules are coupled to the set of HDD/Flash SSD RAID controllers. The set of HDD modules typically comprises a set of HDD/Flash SDD units.

16 Claims, 5 Drawing Sheets

HYBRID STORAGE SYSTEM FOR A MULTI-LEVEL RAID ARCHITECTURE

CROSS-REFERENCE TO RELATED APPLICATION

This application is related in some aspects to commonly-owned, co-pending application Ser. No. 12/758,937, entitled SEMICONDUCTOR STORAGE DEVICE", filed on Apr. 13, 2010, the entire contents of which are herein incorporated by reference. This application is also related in some aspects to commonly-owned, co-pending application Ser. No. 12/796,709, entitled HYBRID STORAGE DEVICE WITH MID-PLANE, filed on Jun. 9, 2010, the entire contents of which are herein incorporated by reference. This application is also related in some aspects to commonly-owned, co-pending application Ser. No. 12/796,735, entitled SWITCH-BASED HYBRID STORAGE SYSTEM, filed on Jun. 9, 2010, the entire contents of which are herein incorporated by reference.

FIELD OF THE INVENTION

The present invention generally relates to semiconductor storage devices (SSDs). Specifically, the present invention relates to a switch-based hybrid storage system.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

In general, the present invention relates to semiconductor storage systems (SSDs). Specifically, the present invention relates to a switch-based hybrid storage system. In a typical embodiment, a set of double data rate semiconductor storage device (DDR SSD) RAID controllers is coupled to a system control board, and a set of DDR SSD modules to the set of DDR SSD RAID controllers. The set of DDR SSD modules typically comprises a set of DDR SSD units. In addition, a set of HDD/Flash SSD RAID controllers is also coupled to the system control board, and a set of hard disk drive (HDD) modules is coupled to the set of HDD/Flash SSD RAID controllers. The set of HDD modules typically comprises a set of HDD/Flash SDD units.

A first aspect of the present invention provides a hybrid storage system for a multi-level RAID architecture, comprising: a system control board; a set of double data rate semiconductor storage device (DDR SSD) RAID controllers coupled to the system control board; a set of DDR SSD modules coupled to the set of DDR SSD RAID controllers, the set of DDR SSD modules comprising a set of DDR SSD units; a set of HDD/Flash SSD RAID controllers coupled to the system control board; and a set of hard disk drive (HDD) modules coupled to the set of HDD/Flash SSD RAID controllers, the set of HDD modules comprising a set of HDD/Flash SDD units.

A second aspect of the present invention provides a hybrid storage system for a multi-level RAID architecture, comprising: a first double data rate semiconductor storage device (DDR SSD) RAID controller coupled to a system control board; a first DDR SSD module coupled to the first DDR SSD RAID controller, the first DDR SSD module comprising a first set of DDR SSD units; a second DDR SSD RAID controller coupled to the system control board; a second DDR SSD module coupled to the second DDR RAID controller, the second DDR SSD module comprising a second set of DDR SSD units; a first HDD/Flash SSD RAID controller coupled to the system control board; a first hard disk drive (HDD) module coupled to the first HDD/Flash SSD controllers the first HDD module comprising a first set of HDD/Flash SDD units; a second HDD/Flash SSD RAID controller coupled to the system control board; and a second set of hard disk drive (HDD) modules coupled to the second HDD/Flash SSD controllers, the second HDD module comprising a second set of HDD/Flash SDD units.

A third aspect of the present invention provides a method for providing a hybrid storage system, comprising: coupling a set of double data rate semiconductor storage device (DDR SSD) RAID controllers to a system control board; coupling a set of DDR SSD modules to the set of DDR SSD RAID controllers, the DDR SSD module comprising a set of DDR SSD units; coupling a set of HDD/Flash SSD RAID controllers to the system control board; and coupling a set of hard disk drive (HDD) modules to the set of HDD/Flash SSD RAID controllers, the HDD module comprising a set of HDD/Flash SDD units.

BRIEF DESCRIPTION OF THE DRAWINGS

These and other features of this invention will be more readily understood from the following detailed description of the various aspects of the invention taken in conjunction with the accompanying drawings in which.

Figure 1:
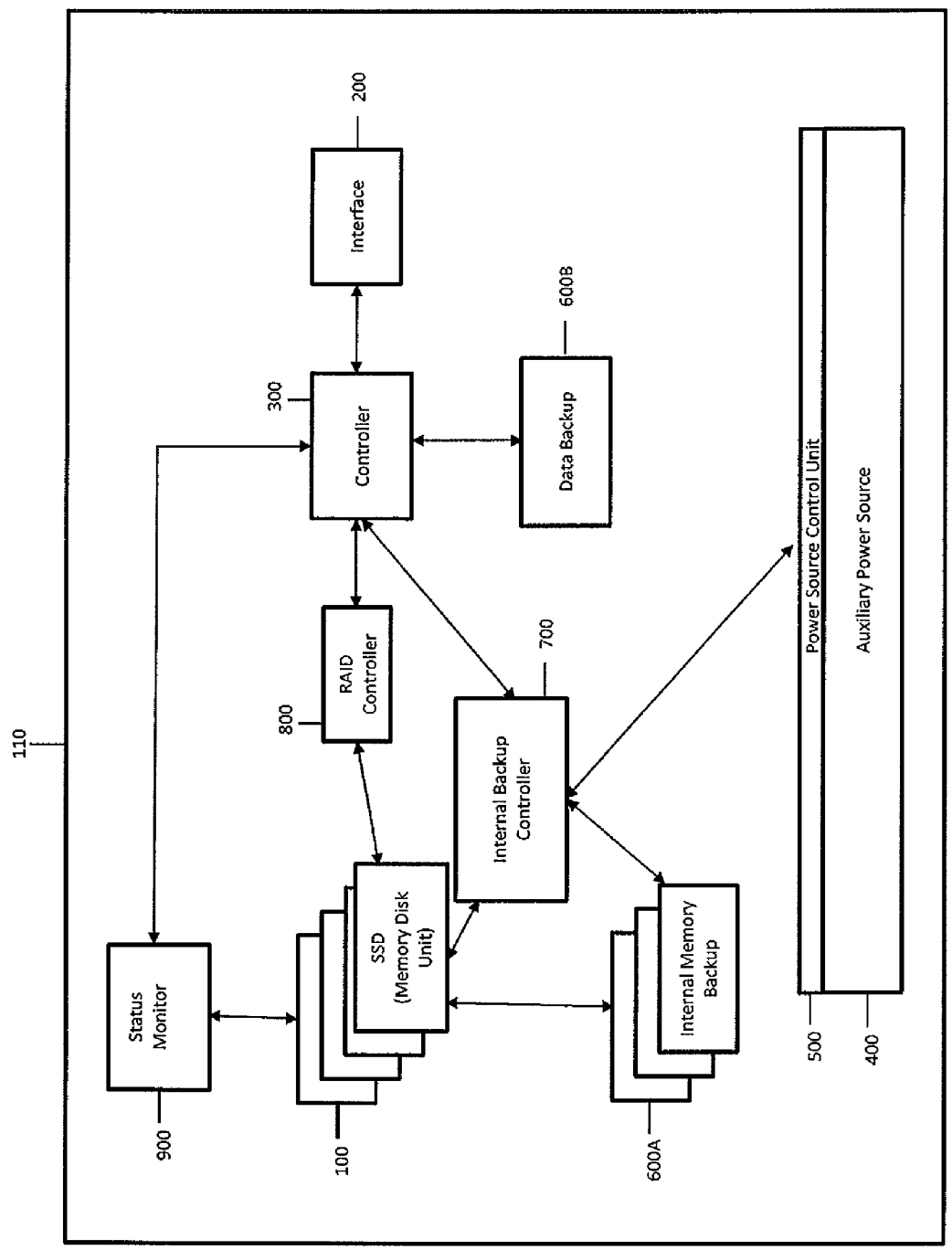
FIG. 1 is a diagram schematically illustrating a configuration of a RAID controlled storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc. do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term DDR means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a serial attached small computer system interface/serial advanced technology attachment (PCI-Express) type according to an embodiment will be described in detail with reference to the accompanying drawings.

As indicated above, In general, the present invention relates to semiconductor storage systems (SSDs). Specifically, the present invention relates to a switch-based hybrid storage system. In a typical embodiment, a set of double data rate semiconductor storage device (DDR SSD) RAID controllers is coupled to a system control board, and a set of DDR SSD modules to the set of DDR SSD RAID controllers. The set of DDR SSD modules typically comprises a set of DDR SSD units. In addition, a set of HDD/Flash SSD RAID controllers is also coupled to the system control board, and a set of hard disk drive (HDD) modules is coupled to the set of HDD/Flash SSD RAID controllers. The set of HDD modules typically comprises a set of HDD/Flash SDD units.

The storage device of a serial attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled storage device (e.g., for providing storage for a serially attached computer device) according to an embodiment of the invention is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600 that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Referring now to FIG. 1, a more detailed diagram of a RAID controlled SSD 810 is shown. As depicted, a PCI-e type RAID controller 800 can be directly coupled to any quantity of SSDs 100. Among other things, this allows for optimum control of SSDs 100. Among other things, the use of a RAID controller 800:

1. Supports the current backup/restore operations.
2. Provides additional and improved backup function by performing the following:
    a) the internal backup controller determines the backup (user's request order or the status monitor detects power supply problems);

b) the internal backup controller requests a data backup to SSDs;
c) the internal backup controller requests internal backup device to backup data immediately;
d) monitors the status of the backup for the SSDs and internal backup controller; and
e) reports the internal backup controller's status and end-op.

3. Provides additional and improved restore function by performing the following:
a) the internal backup controller determines the restore (user's request order or the status monitor detects power supply problems);
b) the internal backup controller requests a data restore to the SSDs;
c) the internal backup controller requests an internal backup device to restore data immediately;
d) monitors the status of the restore for the SSDs and internal backup controller; and
e) reports the internal backup controller status and end-op.

Figure 2:
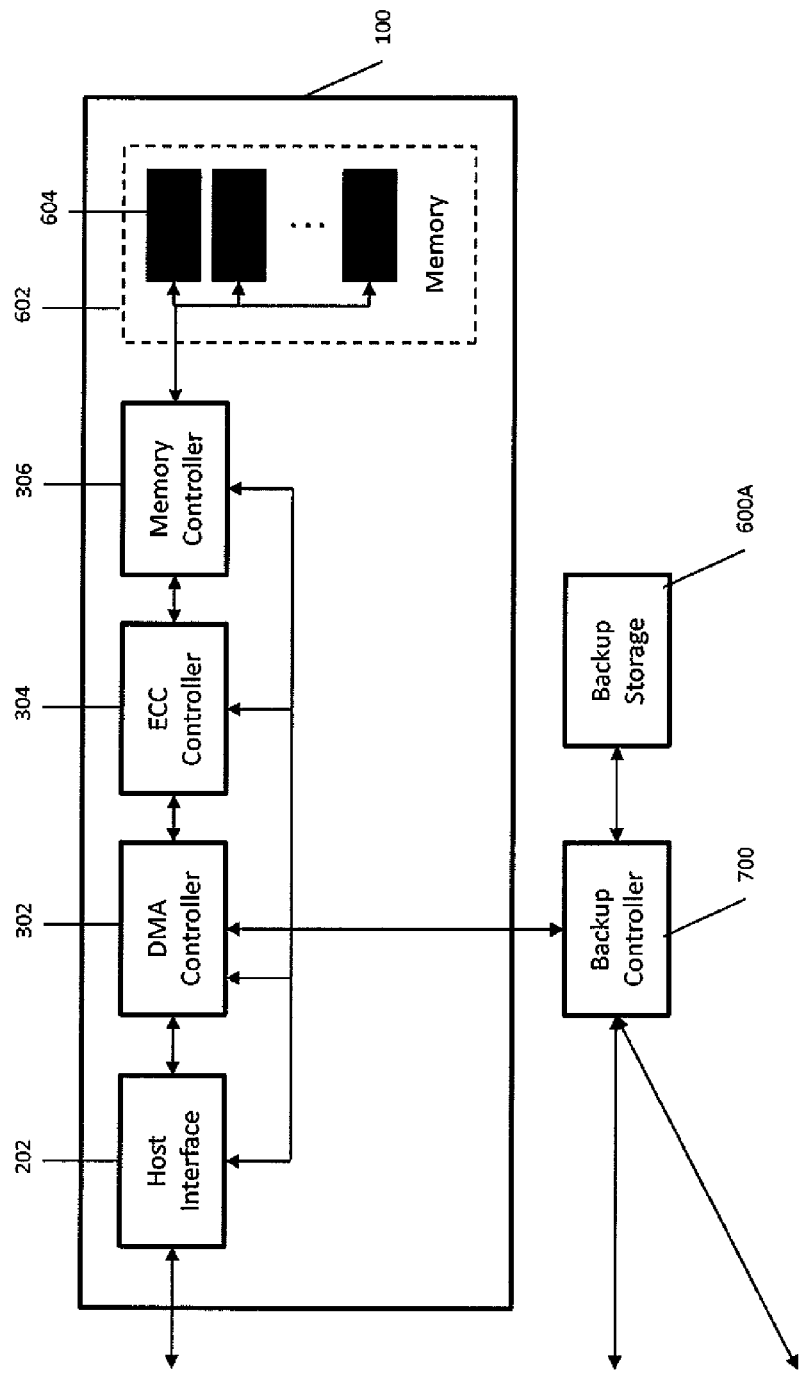
FIG. 2 is a more specific diagram of a RAID controller coupled to a set of SSDs.

Referring now to FIG. 2, a diagram schematically illustrating a configuration of the high-speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller; and a memory controller 306 for controlling one or more blocks 604 of memory 602 that are used as high-speed storage.

Figure 3:
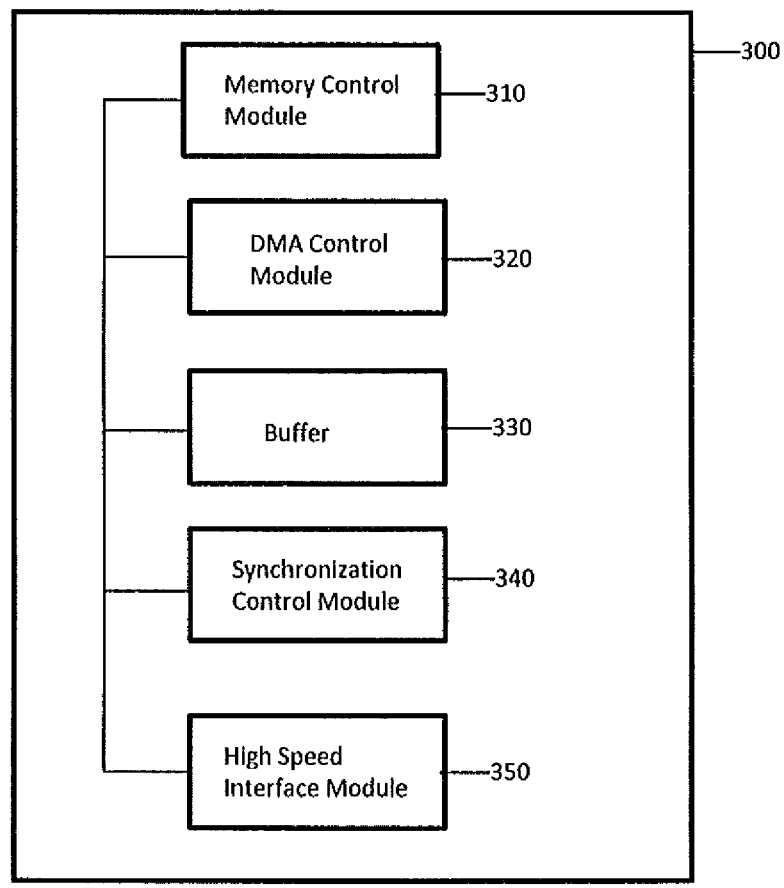
FIG. 3 is a diagram schematically illustrating a configuration of the high-speed SSD of FIG. 1.

Referring now to FIG. 3, a diagram schematically illustrating a configuration of the controller unit provided in the PCI-Express type storage device according to the embodiment is shown. As depicted, the controller unit 300 according to the embodiment includes: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data transmitted/received between the synchronization control module 340 and the DMA control module 320 using the buffers and adjusting data clocks.

Figure 4:
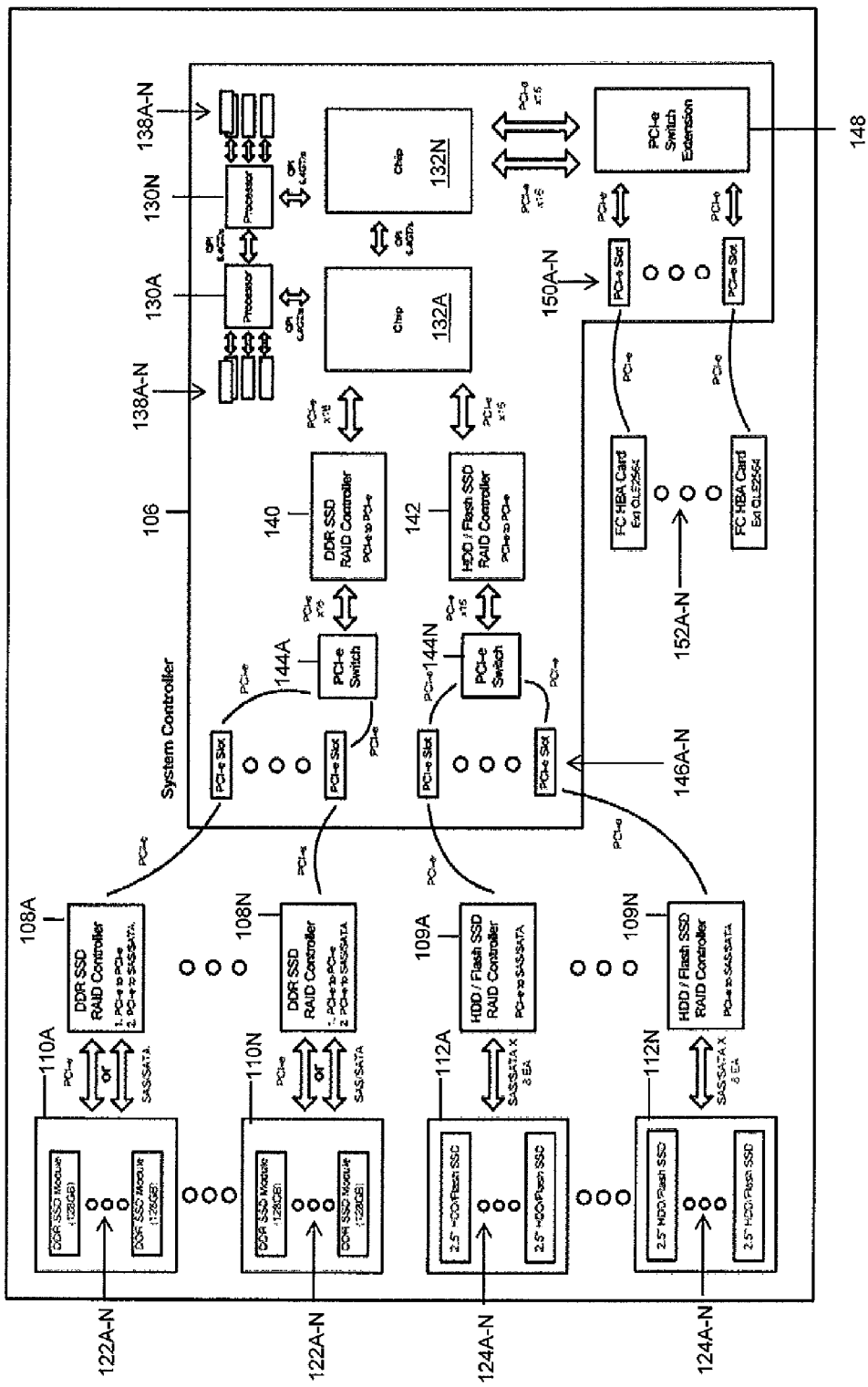
FIG. 4 is a diagram schematically illustrating a hybrid storage system for a multi-level RAID architecture according to an embodiment of the present invention.
Figure 5:
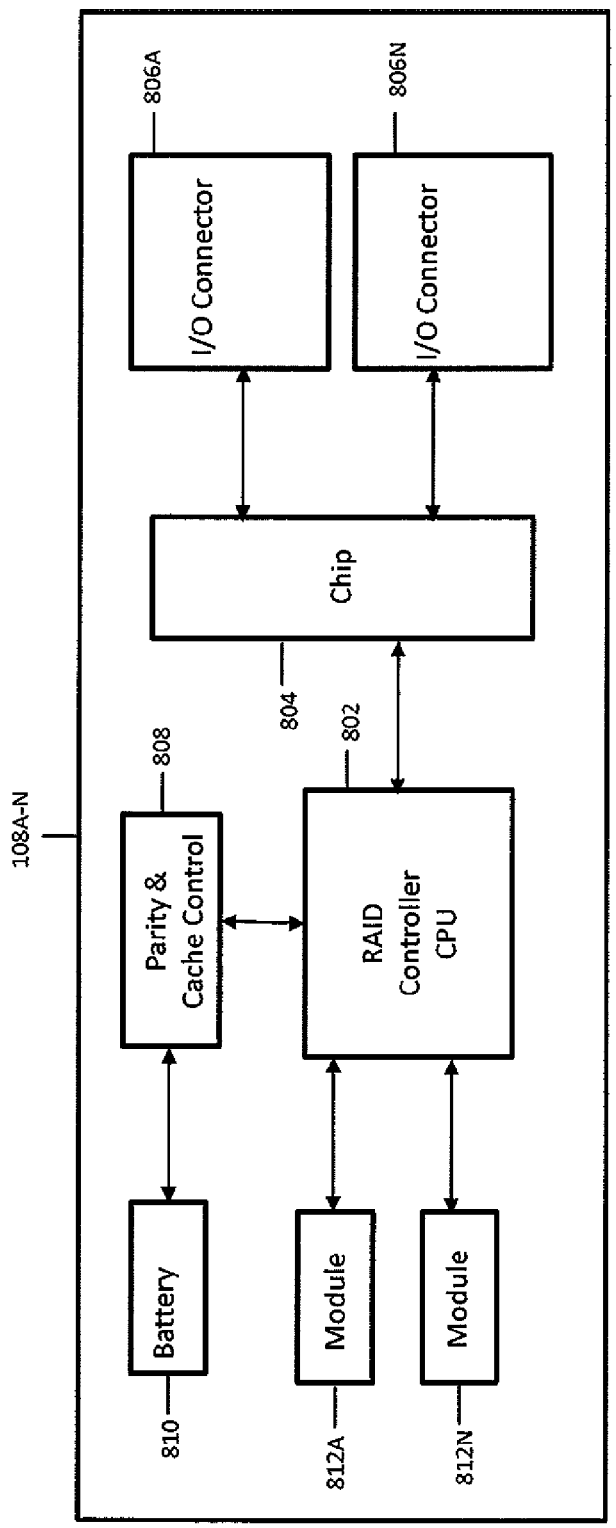
FIG. 5 is a diagram schematically illustrating the RAID controllers shown in FIG. 4 according to an embodiment of the present invention.

Referring now to FIG. 4, a hybrid storage system for a multi-level RAID architecture according to the present invention is shown. It is understood in advance that any connections/components shown in FIGS. 4-5 are preferable of the PCI-Express type. As depicted, the system of the present invention includes (among other things): a system control board 106; a set of double data rate semiconductor storage device (DDR SSD) RAID controllers 108A-N coupled to system control board 106; and a set of DDR SSD modules 110A-N coupled to the set of DDR SSD RAID controllers 108A-N. As depicted, each of the set of DDR SSD modules 110-N comprises a set of DDR SSD units 122A-N. As further shown, a set of HDD/Flash SSD RAID controllers 109A-n are also coupled to system control board 106, and a set of hard disk drive (HDD) modules 112A-N is coupled to the set of HDD/Flash SSD RAID controllers. Each of the set of HDD modules 112A-N typically comprises a set of HDD/Flash SDD units 124A-N. As indicated above, the set of DDR SSD RAID controllers and the set of HDD/Flash SSD RAID controllers are typically PCI-Express (PCI-E) based RAID controllers.

As further depicted, system control board 106 comprises a first chip coupled 132A (e.g., IOH) to a first processor 130A (e.g., Intel Xenon Quad-Core 5520 series); and a second chip 132N (e.g., IOH) coupled to a second processor 130N (e.g., Intel Xenon Quad-Core 5520 series). In addition, DDR SSD memory units 138A-N can be coupled to one or both processors 130A-N. Although not shown, chips 132A-B can have multiple PCI-E Gen.2×16 interconnects. Coupled to chip 132A is a DDR SSD RAID controller 140 and a HDD/Flash SSD RAID controller 142. Coupled to DDR SSD RAID controller 140 and HDD/Flash SSD RAID controller 142 are PCI-E switches 144A-n and PCI-E clots 146A-N, which provide the connectivity/coupling to RAID controllers 108A-N and 109A-N. Coupled to chip 132A and/or 132N is a PCi-E switch extension 148, which itself is coupled to PCI-E slots 150A-N, which are configured to receive cards 152A-N.

Referring now to FIG. 5, RAID controllers 108A-N will be depicted in greater detail. As shown, RAID controller 108A-N typically comprise: a RAID controller CPU 802; a chip 804 coupled to the RAID controller CPU 802; and a set of input/output (I/O) connectors (e.g., MOLEX) 806A-N coupled to the chip 804. Further, a parity and cache control module 808 can be coupled to CPU 802, and a battery module 810 can be coupled to parity and cache control module 808. Still yet, memory modules 812A-N can be coupled to CPU 802 as depicted.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600 is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The present invention supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A hybrid storage system for a multi-level RAID architecture, comprising:
   a system control board;
   a first set of double data rate semiconductor storage device (DDR SSD) RAID controllers of a first level of the multi-level RAID architecture coupled to the system control board;
   a set of DDR SSD modules coupled to the first set of DDR SSD RAID controllers, the set of DDR SSD modules comprising a set of DDR SSD units;
   a first set of HDD/Flash SSD RAID controllers of the first level of the multi RAID architecture coupled to the system control board; and
   a set of hard disk drive (HDD) modules coupled to the first set of HDD/Flash SSD RAID controllers, the set of HDD modules comprising a set of HDD/Flash SDD units;
   wherein the system control board comprises:
   a first chip coupled to a first processor,
   a second chip coupled to a second processor,
   a second set of DDR SSD RAID controllers of a second level of the multi-level RAID architecture coupled to the first chip,
   a second set of HDD/Flash SSD RAID controllers of the second level of the multi-level RAID architecture coupled to the second chip,
   a first PCI-E switch coupled to the second set of DDR SSD RAID controllers, and
   a second PCI-E switch coupled to the second set of HDD/Flash SSD RAID controllers.

2. The hybrid storage system of claim 1, the first set of DDR SSD RAID controllers and the first set of HDD/Flash SSD RAID controllers being PCI-Express (PCI-E) based RAID controllers.

3. The hybrid storage system of claim 1, the second set of DDR SSD RAID controllers being coupled to the first PCI-E switch via at least one PCI-E slot coupled to the first PCI-E switch.

4. The hybrid storage system of claim 1, the second set of HDD/Flash SSD RAID controllers being coupled to the second PCI-E switch via at least one PCI-E slot coupled to the second PCI-E switch.

5. The hybrid storage system of claim 1, the system control board further comprising:
   a PCI-E switch extension coupled to the second chip; and
   at least one PCI-E slot coupled to the PCI-E switch extension for receiving at least one card.

6. The hybrid storage system of claim 1, the first set of DDR SSD RAID controllers and the first set of HDD/Flash SSD RAID controllers each comprising:
   a RAID controller CPU;
   a chip coupled to the RAID controller CPU; and
   a set of input/output (I/O) connectors coupled to the chip.

7. The hybrid storage system of claim 6, the first set of DDR SSD RAID controllers and the first set of HDD/Flash SSD RAID controllers each further comprising a parity and cache control component.

8. A hybrid storage system for a multi-level RAID architecture, comprising:
   a first double data rate semiconductor storage device (DDR SSD) RAID controller of a first level of the multi-level RAID architecture coupled to a system control board;
   a first DDR SSD module coupled to the first DDR SSD RAID controller, the first DDR SSD module comprising a first set of DDR SSD units;
   a second DDR SSD RAID controller of the first level of the multi-level RAID architecture coupled to the system control board;
   a second DDR SSD module coupled to the second DDR RAID controller, the second DDR SSD module comprising a second set of DDR SSD units;
   a first HDD/Flash SSD RAID controller of the first level of the multi-level RAID architecture coupled to the system control board;
   a first hard disk drive (HDD) module coupled to the first HDD/Flash SSD controller, the first HDD module comprising a first set of HDD/Flash SDD units;
   a second HDD/Flash SSD RAID controller of the first level of the multi-level RAID architecture coupled to the system control board; and
   a second hard disk drive (HDD) module coupled to the second HDD/Flash SSD controller, the second HDD module comprising a second set of HDD/Flash SDD units;
   wherein the system control board comprises:
   a first chip coupled to a first processor,
   a second chip coupled to a second processor,
   a first DDR SSD RAID controller of a second level of the multi-level RAID architecture coupled to the first chip, a first HDD/Flash SSD RAID controller of the second level of the multi-level RAID architecture coupled to the second chip, a first PCI-E switch coupled to the first DDR SSD RAID controller of the second level of the multi-level RAID architecture, and a second PCI-E switch coupled to the first HDD/Flash SSD RAID controller of the second level of the multi-level RAID architecture.

9. The hybrid storage system of claim 8, the first DDR SSD RAID controller, the second DDR SSD RAID controller, the first HDD/Flash SSD RAID controller, and the second HDD/Flash SSD RAID controller being PCI Express (PCI-E) based RAID controllers.

10. The hybrid storage system of claim 8, the system control board further comprising, the first DDR SSD RAID controller of the second level of the multi-level RAID architecture being coupled to the PCI-E switch via at least one PCI-E slot coupled to the first PCI-E switch.

11. The hybrid storage system of claim 8, wherein the first HDD/Flash SSD RAID controller of the second level of the multi-level RAID architecture is coupled to the second PCI-E switch via at least one PCI-E slot coupled to the second PCI-E switch.

12. The hybrid storage system of claim 8, the system control board further comprising:
   a PCI-E switch extension coupled to the second chip; and
   at least one PCI-E slot coupled to the PCI-E switch extension for receiving at least one card.

13. The hybrid storage system of claim 8, the first and the second DDR SSD RAID controllers of the first level of the multi-level RAID architecture and the first and the second HDD/Flash SSD RAID controllers of the first level of the multi-level RAID architecture each comprising:
   a RAID controller CPU;
   a chip coupled to the RAID controller CPU; and
   a set of input/output (I/O) connectors coupled to the chip.

14. The hybrid storage system of claim 13, the first and the second DDR SSD RAID controllers of the first level of the multi-level RAID architecture and the first and the HDD/Flash SSD RAID controllers of the first level of the multi-level RAID architecture each further comprising a parity and cache control component.

15. A method for providing a hybrid storage system, comprising:
   coupling a first set of double data rate semiconductor storage device (DDR SSD) RAID controllers of a first level of a multi-level RAID architecture to a system control board;
   coupling a set of DDR SSD modules to the first set of DDR SSD RAID controllers, the set of DDR SSD modules comprising a set of DDR SSD units;
   coupling a first set of HDD/Flash SSD RAID controllers of the first level of the multi-level RAID architecture to the system control board; and
   coupling a set of hard disk drive (HDD) modules to the first set of HDD/Flash SSD RAID controllers, the set of HDD modules comprising a set of HDD/Flash SDD units;
   wherein the system control board comprises:
   a first chip coupled to a first processor,
   a second chip coupled to a second processor,
   a second DDR SSD RAID controller of a second level of the multi-level RAID architecture coupled to the first chip,
   a second HDD/Flash SSD RAID controller of the second level of the multi-level RAID architecture coupled to the second chip,
   a first PCI-E switch coupled to the second DDR SSD RAID controller, and
   a second PCI-E switch coupled to the second HDD/Flash SSD RAID controller.

16. The method of claim 15, the set of DDR SSD RAID controllers and the first set of HDD/Flash SSD RAID controllers being PCI-Express (PCI-E) based RAID controllers.

* * * * *